(No Model.)
T. W. EMERY.
COAL OR GRAIN CHUTE.
No. 444,745. Patented Jan. 13, 1891.
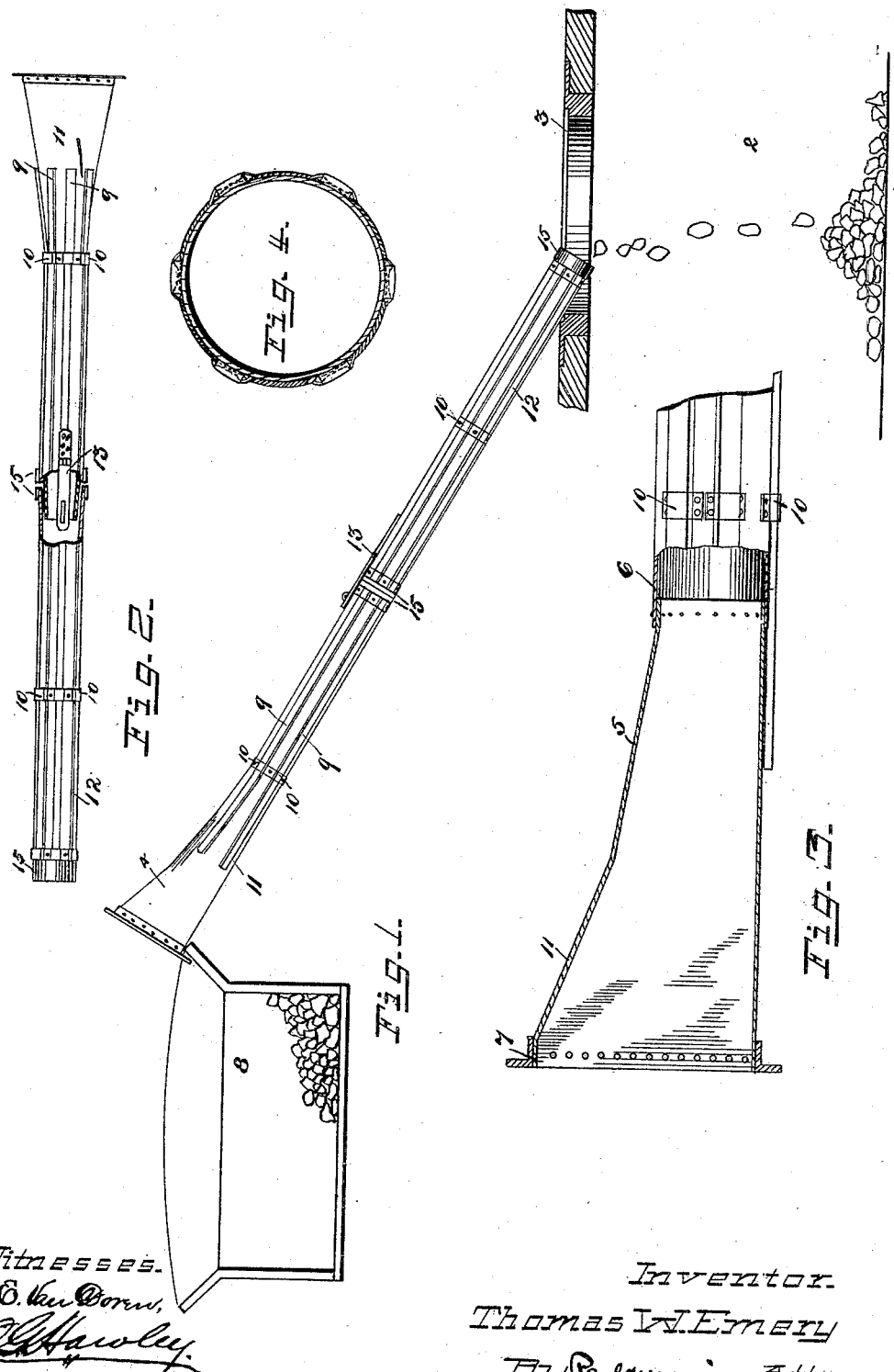
Witnesses.
C. C. Van Dorn,
O. G. Hawley
Inventor.
Thomas W. Emery
By Paul & Morrison Attys.
THE NORRIS PETERS CO., PHOTO-LITHO., WASHINGTON, D. C.

UNITED STATES PATENT OFFICE.

THOMAS WM. EMERY, OF MINNEAPOLIS, MINNESOTA.

COAL AND GRAIN CHUTE.

SPECIFICATION forming part of Letters Patent No. 444,745, dated January 13, 1891.

Application filed September 18, 1890. Serial No. 365,352. (No model.)

*To all whom it may concern:*

Be it known that I, THOMAS WM. EMERY, of Minneapolis, in the county of Hennepin and State of Minnesota, have invented certain Improvements in Coal and Grain Chutes, of which the following is a specification.

My invention relates to means for unloading grain or coal from wagons, &c., and conveying the same into the desired receptacles.

The object of my invention is to provide, first, a light and conveniently-handled adjustable chute; second, to provide means whereby the upper end thereof may be held in position on the wagon or bin, and, third, to protect the chute from being bent or bruised.

To these ends my invention consists in a chute made of sheet metal, preferably steel, and consisting in a hopper-section and one or more lap-sections of pipe adapted to be locked together, said hopper having an angle-iron frame adapted to strengthen the same and to hook over the edge of the wagon or bin, said chute being also re-enforced or strengthened by means of wooden slats or ribs secured longitudinally at intervals around the exterior of the pipe.

My invention will be more readily understood by reference to the accompanying drawings, in which—

Figure 1 is an elevation showing a chute embodying my invention in one of its practical uses. Fig. 2 is a plan view of my chute, portions of the same being broken away to show the slip-joint connection. Fig. 3 is a longitudinal sectional elevation showing the construction of the hopper-section. Fig. 4 shows other means for securing the slats upon the chute.

In Fig. 1 of the drawings I have shown the chute in use with a coal-wagon to convey the coal therefrom into the storage-room 2 beneath the sidewalk 3. It will be seen that the greater portion of the chute is of equal size and of a cylindrical form. At the top of the chute I provide the hopper 4, into which the coal is shoveled from the wagon. This hopper is of the form most clearly shown in Fig. 3, the opening of the same being quite broad and high and the sides thereof, with the exception of the bottom, which is level, tapering sharply down to dimensions somewhat greater than the diameter of the section 6 of the chute. This portion of the hopper is connected with the cylindrical part 6 of the chute by the portion 5, the slant of which is considerably less than the sides of the hopper. The sides of the hopper might be made to slant clear down to the joint between the same and the pipe 6; but I prefer the construction shown, inasmuch as all clogging of material in the hopper as it passes into the round pipe is thereby prevented. I strengthen the upper edges of the hopper by the angle-iron 7, riveted about the same, said angle-iron being made in one piece and bent to conform to the shape of the opening. This angle-iron serves, as shown, to prevent the hopper from slipping off the edge of the wagon 8, over which it is hooked.

The principal feature of my invention consists in providing the slats 9 on the outside of the chute. These slats 9 are preferably of wood, and serve not only to strengthen and to prevent bruising or bending of the pipe, but also to greatly deaden the sound made by the striking of the coal upon the steel pipe. The slats are secured around the pipe at convenient distances apart, a space equal at least to the width of one slat being preferably left between each two slats. These slats are secured to the pipe in any suitable manner, preferably with the sheet-metal staples 10, riveted through the pipe. Collars 15 are provided on the ends of the pipes. The ends of the slats butt against these collars, and are thereby prevented from slipping out. The slats upon the upper section 11 of the chute are extended up upon the hopper portion to protect and strengthen the same. If at any time it is desired to renew these slats, they may be very easily slipped out from under the staples and new slats put in.

I have shown my chute made in two sections 11 and 12, the lower section slipping over the lower end of the upper section, as shown in Fig. 2, and the two being held together by the hinge-and-staple coupler 13. It is sometimes preferable to construct the chute so that no rivet-heads will project into the same to clog the passage of material therethrough. In such cases I employ a simple wire extending around the pipe and through all of the slats in series.

A further advantage of this plan is that the wire is not exposed to wear on the face of the slat, as are the tops of the flat staples 10.

It is obvious that I may make my chute either of round or square pipe and in any number of sections, which when not in use may be disconnected and stored conveniently for transportation. I am thus able to provide a very light and desirable chute adapted for use with coal, grain, or other material, and which, while very strong, is of a simple and cheap construction, and which, unlike other metal chutes, does not create a din when used with coal or other hard substance.

Having thus described my invention, I claim as new and desire to secure by Letters Patent—

1. In a device of the class described, the combination of the metallic pipe-sections, with ribs or slats movably secured upon the outside of said sections longitudinally thereof, a hopper connected to one of said sections, and an angle-iron frame secured upon the outside of said hopper at its upper edge, substantially as and for the purpose set forth.

2. In a chute, the combination of the hopper, the upper section or round pipe, the lower section or sections, slip-joints between said sections, means for coupling said sections together, and wooden slats secured longitudinally upon the said section by suitable staples, substantially as and for the purpose specified.

3. The combination, in a chute, of the hopper 4, provided with the angle-iron frame 7, with the portion 5, connecting said hopper with the round pipe 6, the wooden slats 9, provided at convenient distances around said pipe 6, and the staples 10, substantially as described.

4. The combination, with the hopper, of the round sheet-metal pipe 6, the angle-iron 7, the lower section 12, connected with said pipe 6 by a slip-joint and a coupler 10, the lock 13, and the wooden slats 9, movably secured upon the several sections of the chute, substantially as described.

5. A chute comprising, in combination, a thin sheet-metal pipe, loops for staples upon the exterior of said pipe, slats inserted through said loops longitudinally of said pipe, and shoulders or collars upon said pipe, against which the ends of the slats abut, and by means of which they are held in position, substantially as described.

In testimony whereof I have hereunto set my hand this 15th day of September, 1890.

THOMAS WM. EMERY.

In presence of—
O. G. HAWLEY,
A. M. GASKILL.